United States Patent
Van Der Velde (10) Patent No.: US 11,678,210 B2
(45) Date of Patent: Jun. 13, 2023

(54) METHOD AND APPARATUS FOR PERFORMING COMMUNICATION IN WIRELESS COMMUNICATION SYSTEM

(71) Applicant: Samsung Electronics Co., Ltd., Suwon-si (KR)

(72) Inventor: Himke Van Der Velde, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 16/874,561

(22) Filed: May 14, 2020

(65) Prior Publication Data

US 2020/0404524 A1    Dec. 24, 2020

(30) Foreign Application Priority Data

May 14, 2019  (GB) ..................... 1906765
May 12, 2020  (GB) ..................... 2006984

(51) Int. Cl.
*H04W 24/10* (2009.01)
*H04W 76/15* (2018.01)
*H04W 24/08* (2009.01)

(52) U.S. Cl.
CPC ........... *H04W 24/10* (2013.01); *H04W 24/08* (2013.01); *H04W 76/15* (2018.02)

(58) Field of Classification Search
CPC ..... H04W 24/10; H04W 24/08; H04W 76/15; H04W 16/14; H04W 36/0069; H04W 72/042; H04L 5/0092; H04L 5/001
See application file for complete search history.

(56) References Cited

U.S. PATENT DOCUMENTS

2017/0359747 A1   12/2017  Lunden et al.

FOREIGN PATENT DOCUMENTS

WO    2018175721 A1    9/2018

OTHER PUBLICATIONS

"3GPP TSG-RAN WG2 Meeting #102, Busan, South Korea, May 21-25, 2018, R2-1806772, Nokia, Nokia Shanghai Bell, Finalizing Idle mode measurements for euCA" (Year: 2018).*
International Search Report and Written Opinion of the International Searching Authority in connection with International Application No. PCT/KR2020/006369 dated Sep. 25, 2020, 10 pages.
Apple, "Early Measurement Report in NR," R2-1907172 (Resubmission of R2-1903611), 3GPP TSG-RAN WG2 Meeting #106, Reno, USA, May 13-17, 2019, 5 pages.

(Continued)

*Primary Examiner* — Walli Z Butt
*Assistant Examiner* — Thad N Defauw (57) ABSTRACT

Disclosed is a method of a User Equipment, UE, in a telecommunication network, performing a measurement in an idle state, comprising the steps of: the network broadcasting a first message; the network transmitting a dedicated second message to the UE; wherein the first message comprises information related to one or more frequencies used in a particular cell in the network and the second message comprises information concerning frequencies specific to the UE, wherein the UE receives the first and second messages and performs the measurement on at least one frequency present in both the first and second messages.

20 Claims, 7 Drawing Sheets

(56) References Cited

OTHER PUBLICATIONS

Nokia, et al., "Finalizing Idle mode measurements for euCA," R2-1806772, 3GPP TSG-RAN WG2 Meeting #102, Busan, South Korea, May 21-25, 2018, 7 pages.
ZTE Corporation, et al., "Early measurement reporting for RRC idle and inactive state," R2-1900801, 3GPP TSG-RAN WG2 Meeting #105, Athens, Greece, Feb. 25-Mar. 1, 2019, 7 pages.
European Patent Office, "Supplementary European Search Report" dated Apr. 13, 2022, in connection with European Patent Application No. 20806660.5, 13 pages.
Qualcomm Incorporated, "Summary of email discussion [106#36] [NR/eCA-DC]: measurement and reporting configuration", 3GPP TSG-RAN WG2 Meeting#107, Prague, Czech, Aug. 26-30, 2019, 40 pages.
Vivo, "Measurement in Idle and Inactive States," 3GPP TSG-RAN WG2 Meeting #105; Athens, Greece, R2-1900261, Feb. 25-Mar. 1, 2019, 3 pages.
Spreadtrum Communications, "Procedure of early measurement reporting for NR Inactive," R2-1905685, 3GPP TSG-RAN WG2 Meeting #106, Reno, USA, May 13-17, 2019, 3 pages.
Ericsson, "Feature summary for early measurement", R2-2003790, TSG-RAN WG2 Meeting #109bis_e, Electronic meeting, Apr. 20-24, 2020, 7 pages.

* cited by examiner

METHOD AND APPARATUS FOR PERFORMING COMMUNICATION IN WIRELESS COMMUNICATION SYSTEM

CROSS-REFERENCE TO RELATED APPLICATION

This application is based on and claims priority under 35 U. S. C. § 119 to Great Britain Application No. 1906765.1 filed on May 14, 2019, and Great Britain Application No. 2006984.5 filed on May 12, 2020 in the Great Britain Intellectual Property Office, the disclosures of which are incorporated by reference herein in their entirety.

BACKGROUND

1. Field

The present disclosure relates generally to wireless communication systems, more specifically, the present disclosure relates to the process of measurements performed by a User Equipment (UE) as part of a process of connecting, re-connecting or otherwise changing status with respect to a telecommunication network.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services may be provided according to the development of a wireless communication system, and thus a method for easily providing such services is required.

SUMMARY

According to a first aspect of the present invention, there is provided a method of a User Equipment, UE, in a telecommunication network, performing a measurement in an idle state, comprising the steps of: the network broadcasting a first message; the network transmitting a dedicated second message to the UE; wherein the first message comprises information related to one or more frequencies used in a particular cell in the network and the second message comprises information concerning frequencies specific to the UE, wherein the UE receives the first and second messages and performs the measurement on at least one frequency present in both the first and second messages.

In an embodiment, the UE, immediately prior to entering the idle state, was connected in one of a Carrier Aggregation or Dual Connectivity mode.

In an embodiment, the measurement includes measuring SSB RS.

In an embodiment, the UE further provides an indication to the network regarding performance of the measurement results.

In an embodiment, the first message or second message additionally includes instructions for the UE regarding more than one measurement which should be made and what parameter should be reported to the network.

In an embodiment, the network indicates its support for the method of any preceding claim either explicitly or implicitly.

In an embodiment, explicit support is indicated by an indicator in a signal and implicit support is indicated by scheduling of a related SIB.

In an embodiment, the UE provides an indication to the network that the measurement has been performed.

In an embodiment, if the UE is resuming and was previously connected to a Secondary Cell Group, the UE indicates to the network if resumption with the Secondary Cell Group is desired or not.

In an embodiment, when the network provides configuration data to the UE upon entering idle state, the configuration may be indicated by means of full or delta signalling and wherein whether full or delta signalling is used is indicated by means of a signal from the network to the UE.

According to a second aspect of the present invention, there is provided a telecommunication network operable to communicate with a UE in an idle state, the network being operable to:

broadcast a first message; transmit a dedicated second message to the UE; wherein the first message comprises information related to one or more frequencies used in a particular cell in the network and the second message comprises information concerning frequencies specific to the UE, such that when the UE receives the first and second messages, it is operable to perform the measurement on at least one frequency present in both the first and second messages.

According to a third aspect of the present invention, there is provided a UE operable, in an idle state, to: receive a first message broadcast from a telecommunication network; receive a dedicated second message transmitted to the UE from the network; wherein the first message comprises information related to one or more frequencies used in a particular cell in the network and the second message comprises information concerning frequencies specific to the UE, wherein the UE, upon receiving the first and second messages, is operable to perform the measurement on at least one frequency present in both the first and second messages.

According to a fourth aspect of the present invention, there is provided method of identifying UE capabilities in connection with different RATs in a telecommunication network, wherein a RAN requests one or more subsets of capability information from a UE and the UE responds with one or more respective subsets of capability information and the network uses an identifier for such subset of capability information, both in interactions with the UE as well as between network nodes.

According to the present invention there is provided an apparatus and method as set forth in the appended claims. Other features of the invention will be apparent from the dependent claims, and the description which follows.

Although a few preferred embodiments of the present invention have been shown and described, it will be appreciated by those skilled in the art that various changes and modifications might be made without departing from the scope of the invention, as defined in the appended claims.

BRIEF DESCRIPTION OF THE DRAWINGS

For a better understanding of the invention, and to show how embodiments of the same may be carried into effect, reference will now be made, by way of example only, to the accompanying diagrammatic drawings in which.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

A communication system includes a downlink (DL) that conveys signals from transmission points such as base stations (BSs) or NodeBs to user equipments (UEs) and an uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB (eNB), referring to a NodeB in long-term evolution (LTE) communication system, and a gNodeB (gNB), referring to a NodeB in new radio (NR)

communication system, may also be referred to as an access point or other equivalent terminology.

A UE may connect or re-connect from an idle, suspended or inactive state. Embodiments of the invention may find any use in a variety of telecommunication networks. Specific embodiments are described in the context of Fifth Generation (5G) or New Radio (NR) networks, but other types of network may also benefit.

Regardless of whether a UE is connecting or re-connecting to a network from an idle or inactive state, it may be configured to perform certain measurements and report some or all of these back to the network to assist in the call setup or resumption procedure or for other reasons. As an example, early availability of measurement results may enable the network to quickly configure secondary cells on the frequencies for which such results are provided.

When a UE is connected to a network via either Carrier Aggregation (CA) or Dual Connectivity (DC), this introduced certain additional issues if and when a UE enters an idle or inactive state. This is also referred to as a "suspend" state. Once the active state is ended, for whatever reason, and if the connection is resumed, any secondary cells that were previously configured are lost.

As a result, resuming an active state with CA/DC following a suspension can take longer than would be desirable.

It is an aim of embodiments of the present invention to address these and other issues in the prior art.

According to an embodiment of the present invention, a UE, while in an idle mode, is operable to perform measurements prior to resuming so that the resumption can be performed more speedily than would otherwise be the case. The measurements made relate to one or more of strength of received signal, quality of received signal and the like, indicative of the chances of establishing a good quality connection. One such measurement includes measuring SSB-RS.

In the following, 'idle state' can include RRC_IDLE, suspected and RRC-INACTIVE.

Furthermore, idle state may refer to an idle state in one of NR and LTE, including the case of being in an idle state in LTE while the measurements concern NR.

Embodiments of the present invention permit early configuration of secondary cells, thereby improving user experience and reducing time delays.

In idle and inactive, the UE is anyhow required to perform measurements for the purpose of cell re-selection. This concerns the frequencies used for camping. The UE may however also be configured to perform early measurements on other frequencies e.g. frequencies not used for camping but purely for the configuration of Secondary Cells (SCells). The measurements concerning such frequencies are additional and hence a potential burden on the UE. However, it is desirable for a particular UE not to perform multiple unnecessary measurements, since this places an excessive burden on the UE and can impact, amongst other performance indicators, the battery life of the UE.

Figure 1:
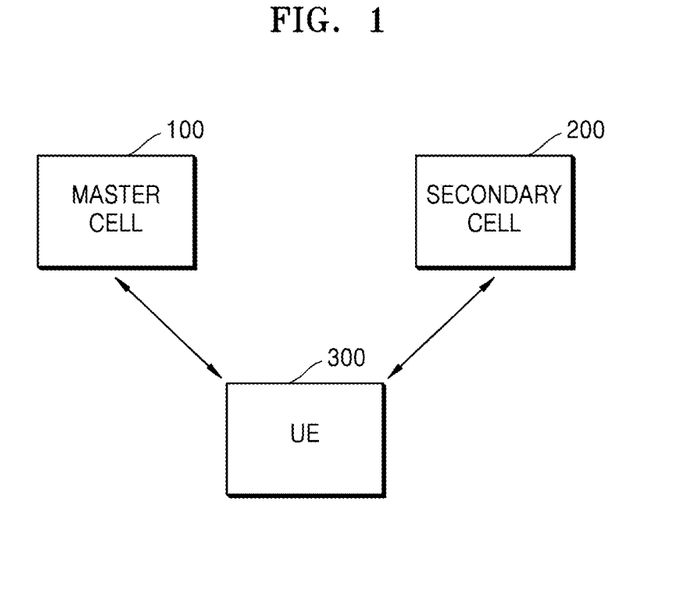
FIG. 1 shows a representation of a network setup according to an embodiment of the invention.

FIG. 1 shows a general set up of a network, comprising a UE 300, which is, prior to entering the idle state, configured with a Master Cell 100 and a Secondary Cell 200.

In an embodiment, a UE is informed which measurements to make, early in the process, by means of one or more of dedicated signalling and broadcast signalling. Dedicated signalling is signalling from the network which is specific to a particular identified UE. Broadcast signalling is cell-specific signalling which is available to and received by all UEs in a particular cell.

The dedicated signalling indicates the superset of frequencies which the particular UE is requested to measure. However, a particular one of the frequencies from this superset is measured only if the cell that the UE camps on additionally indicates as part of the broadcast signalling that the frequency is used locally i.e. that cells are deployed on the concerned frequency in this area of the network. This is because not all frequencies are used in all cells and there is no point in a UE attempting measurements which will fail, hence the mixture of dedicated and broadcast signalling. Searching for cells on such an unused frequency will merely drain UE battery. This is prevented by the combined use of dedicated and broadcast signalling as shown in this embodiment.

In this way, the specificity of measurements for a particular UE can be maintained within the context of the frequencies which are used locally in a particular cell. This prevents the UE from being over burdened by performing measurements for frequencies which are not relevant to it. Of course, the UE will still be required to perform the measurements usually required for cell re-selection, but in an embodiment of the invention, certain additional measurements can be made earlier than would otherwise be the case, resulting in speedier resumption.

As an example, dedicated signalling provided for UE1 indicates that UE1 should monitor f1, f3 and f5, while UE2 should monitor f1, f2, f3 and f4. Cell C1 indicates in its broadcast signalling that f1 and f2 are available (i.e. within its coverage area, there should be cells on these frequencies), while cell C2 indicates that f1, f3 and f4 are available. This can be summarised as in the following table which shows which frequencies are to be measured by which UE in which cell.

|  | Cell C1 | Cell C2 |
| --- | --- | --- |
| UE1 | f1 | f1, f3 |
| UE2 | f1, f2 | f1, f3, f4 |

As mentioned above, this mix of dedicated and broadcast signalling is used to indicate to the UE(s) which frequencies to measure, but other uses can be envisaged for this mix of signalling via dedicated and broadcast means. For instance, the signalling may be used to indicate exactly what should be measured by the UE(s) if, for instance, this differs from a default option. It may also be used to indicate to the UE(s) exactly what parameter(s) should be reported back to the network.

Figure 2:
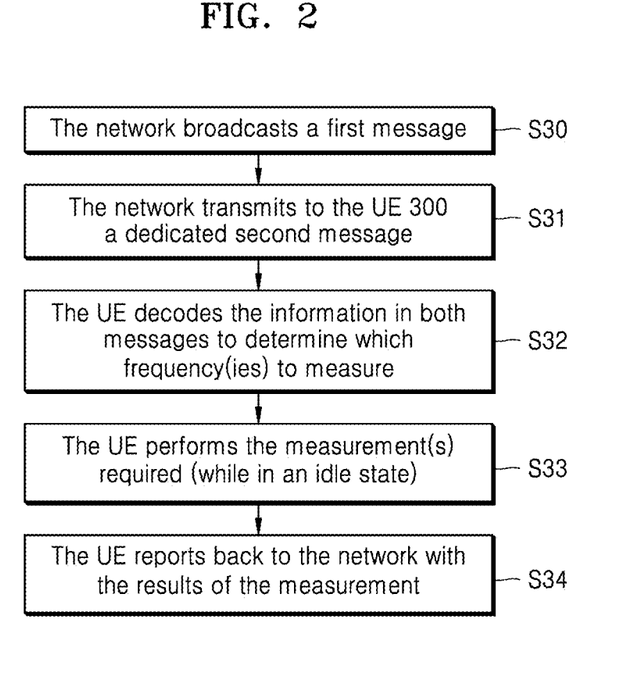
FIG. 2 shows a flowchart of a method according to an embodiment of the invention.

A method according to an embodiment of the invention is shown in FIG. 2, where the steps are illustrated as:

S30: The network broadcasts a first message;

S31: The network transmits to the UE 300 a dedicated second message (typically when commanding UE to enter an idle state e.g. when releasing the radio connection);

S32: The UE decodes the information in both messages to determine which frequency(ies) to measure;

S33: The UE performs the measurement(s) required (while in an idle state); and

S34: The UE reports back to the network with the results of the measurement(s) (typically upon or immediately following transition to a connected state).

Additionally, the manner in which the information included in the dedicated and broadcast signals may be combined in different ways. As set out above, the frequency information supplied to the UE via both dedicated and broadcast signalling is logically ANDed so that only frequencies appearing in both forms of signalling for a particular UE are measured. However, the information appearing in each form of signalling could, instead, be logically ORed, whereby a frequency appearing in only one of the lists is measured.

Similarly, parameter values can be used whereby the actual value to use is either (also for Boolean): lowest value of both (MIN) or highest value of both (MAX).

In general, it is preferable to support dedicated signalling for all configurations and to use broadcast signalling only for a few cases. Since there are more configuration parameters affecting UE measurement burden (such as quantities, beam results etc), it is preferable to limit the information broadcast as it has to be provided on each cell used for camping. This approach enables the network to properly indicate which frequencies are locally available. Furthermore, this avoids the need for a validity area concept.

The network indicates its support for the early measurements referred to above. This may be done explicitly by, for example, the use of a special indicator included in some signalling. Alternatively, this may be indicated implicitly by e.g. if scheduling information indicates that a related System Information Block (SIB) is scheduled (if use of a separate SIB is adopted) or if a broadcast signal indicates information regarding local availability of early measurement frequencies.

In an embodiment, the UE provides an indication to the network regarding performance of the results of the measurement, such as available based on measurements for cell re-selection or with higher performance e.g. with more frequent measurements. Performance requirements for measurements may not be fully specified and may, at least partly, be left up to the particular UE implementation. In some cases, the UE may not be required to perform any measurements, but it is always permitted to do so, if desired. Such a case may involve when temporarily moving out of an area, while passing a legacy cell.

In the case where the UE is resuming with a Secondary Cell Group (SCG), the UE is able to indicate to the network whether resumption the Secondary Cell (SC) or SCG is preferred or not. This can arise where, before the interruption, the UE was operating in DC mode, where connection was made to a Master Node (MN) and a Secondary Node (SN), data bearers may have been configured that are terminated at MN and at SN, and each may use MCG and/or SCG resources. Resumption may be triggered by the need to transfer to the network data of a particular bearer. If, at resumption, it is required to involve the SN again, this can involve additional signalling, and with an additional network node, and thus slow-down the resumption. However, if the UE indicates that resumption was not triggered by data on the SN, then there is no need to involve the SN, speeding resumption. The indication may be provided explicitly or implicitly by providing or indicating availability of (certain) measurement results.

When providing the configuration to be used in idle, suspended or inactive state, the network may indicate that the information that is provided concerns the full configuration i.e. the UE should release any configuration received previously and then apply the newly received full configuration.

It is assumed that when the network moves the UE to inactive state, it only signals changes compared to the inactive configuration previously assigned to the UE (known as delta signalling). This is in order to avoid repeating the same signalling frequently, as UE can often switch between connected and inactive.

The use of full or delta signalling may be indicated explicitly by use of a dedicated bit in a transmission from the network.

Furthermore, the UE may keep the configuration when it passes a legacy cell. In other words, it maintains the configuration but while camping on such legacy cell (not supporting early measurements) it does not measure or report.

A particular problem is encountered in relation to the network knowing the capabilities of a particular UE, in terms of e.g. its capabilities with respect to certain hardware features, such as frequencies supported. It is generally not efficient to have the UE signal to the network details of its capabilities too frequently. Likewise, it is difficult for the network to obtain and maintain an up to date list.

As the size of UE capabilities has become significant, it has been agreed that UE may provide an identity rather than explicitly signalling the UE capabilities (RACS). This identity, CapID, represents a set of capabilities of the UE for one or more Radio Access Technologies that it supports. UEs of the same model/version would indicate the same CapID and in such case, the network need only needs to store the associated capabilities once even if there are hundreds or thousands of such UEs.

Effectively, the identifier or indicator acts as shorthand for the capabilities and allows a shortened code to be cross-referenced with a database or look up table (LUT) in the CN. Certain further shortcuts may be provided whereby a particular model of UE from a certain a manufacturer is known to have certain capabilities, which means that the capabilities already known to the network do not have to be explicitly indicated again.

There are two types of CapID i.e. a) an identifier assigned by manufacturer and b) an identifier assigned by the network after the UE has uploaded its capabilities. The latter is referred to as PLMN assigned capability ID. While the manufacturer capability ID covers all capabilities supported by the UE, a PLMN-assigned Capability ID (CapID) corresponds to a (sub)set of the UE capabilities i.e. it corresponds to the subset of capabilities as requested by RAN and correspondingly uploaded. As an example, the RAN can request the UE to indicate its capabilities for a subset of the supported Radio Access Technologies (RATs). Moreover, for some of the concerned RATs, the RAN may request the UE to provide a subset of the capabilities that are most relevant for the network. As an example, RAN may request the UE to provide capabilities for a particular set of frequency bands. In this way, the RAN can reduce the amount of capabilities provided by the UE. The network indicates which subset of the capabilities the UE should provide by some fields or parameters that are referred to as the "capability request filter".

In different areas of the PLMN, the RAN nodes may employ a somewhat different capability request filter for example because the set of frequencies that are deployed may be different in the different areas. In case of a PLMN assigned Capability ID, the ID may represent the subset of the UE capabilities corresponding to one particular filter setting as used in one particular area of the network.

To address this issue, use is made of an identifier which identifies a subset of UE capabilities (ReqCapSubset) i.e. it identifies a particular UE capability filter setting. This identifier may be used between the Radio Access Network (RAN) and the Core Network (CN) together with the capability ID.

Here, this latter option is referred to as the ReqCapSubset (requested capability subset).

Note that if 2 UEs have same CapID for one ReqCapSubset, it does not mean they will have same CapID for another ReqCapSubset i.e. UEs may be the same only for some subset of the RATs or of the bands. Otherwise it would be possible to: split the CapID into a part indicating the UE model and a part indicating the ReqCapSubset; and/or infer from one CapID, which CapID applies to the UE for another ReqCapSubset. This could be useful at registration and, in particular, upon handover to a target using another ReqCapSubset.

However, a problem arises in that in different parts of the RAN, a different ReqCapSubset may be used. It is beneficial for the CN to be aware of the filters associated with a PLMN-assigned CapID, since this allows provision of capabilities for proper filtering.

This can avoid the CN needing to have awareness of RAN details e.g. such filters or RAN-specific areas in which they are used.

In order to address these issues, use is made of an identifier for the ReqCapSubset i.e. (referred to as RAT aNd Filter Identity or RnF-ID). Within a particular PLMN, a limited number will be used e.g. 64 . . . 256. At registration/connection establishment, the UE indicates which CapID it has been allocated in the PLMN and for each the associated ReqCapSubset (by the identifier i.e. RnF-ID). The Network (CN and RAN) may know (from Operations, Administration, and Maintenance function, OAM) which RnF-ID is used by the different RAN nodes. The network hence knows whether there is a CapID appropriate for use in the target node. If, upon handover, the RAN does not have the capabilities associated with the target CapID, it may retrieve these from the CN.

When the network, in the form of a base station (gNB) wishes to request capability information for a particular UE, it may request it in a stepwise fashion i.e. in messages related to one RAT at a time. In this context, this means that capability information for 5G/NR may be requested separately from capability information for LTE and/or any other applicable RATs supported.

This is because it may not be possible to transfer all necessary capability information in one message due to message size limitations.

In order to address issues with this approach, the network is operable to separately indicate: full capability information (full ReqCapSubset) i,e, all RATs and for each appropriate filter; and/or an indication regarding transfer of full capabilities of RAT(s) if not CapID for full ReqCapSubset.

In the above, the first option enables the UE to respond with CapID and the second option could be an indication of RAT(s) to be transferred in this step but could also cover additional steps.

Figure 3A:
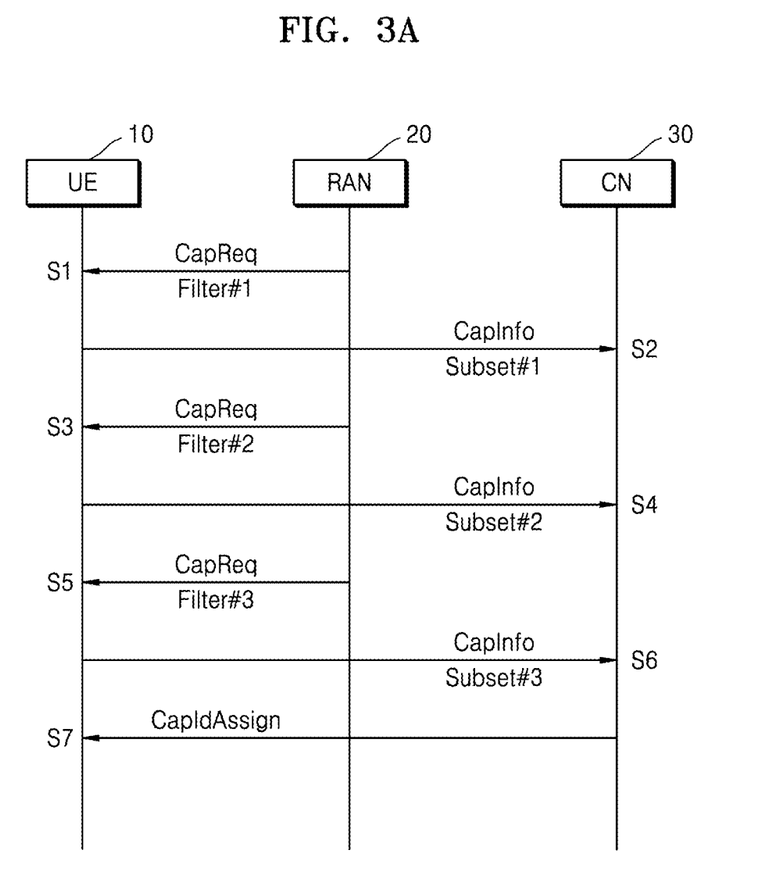
FIG. 3A shows a message flow diagram according to an embodiment of the invention.

This is illustrated in FIG. 3a, which shows a UE 10, a RAN 20 and a CN 30 in communication.

At step S1, the RAN 20 requests capabilities from UE 10 in using Filter #1. The UE responds with the required information to the CN at step S2. Steps S3 and S4 repeat the process in connection with Filter #2, and steps S5 and S6 repeat it again in connection with Filter #3. At step S7, the CN assigns a capability ID (CapID) to the UE determined on the basis of the information provided in steps S2, S4 and S6.

As an example, Filter #1 may be used to request a subset of the NR capabilities (e.g. subset of frequency bands), while Filter #2 concerns a subset of the LTE capabilities (e.g. subset of frequency bands), while Filter #3 concerns the UMTS capabilities.

Figure 3B:
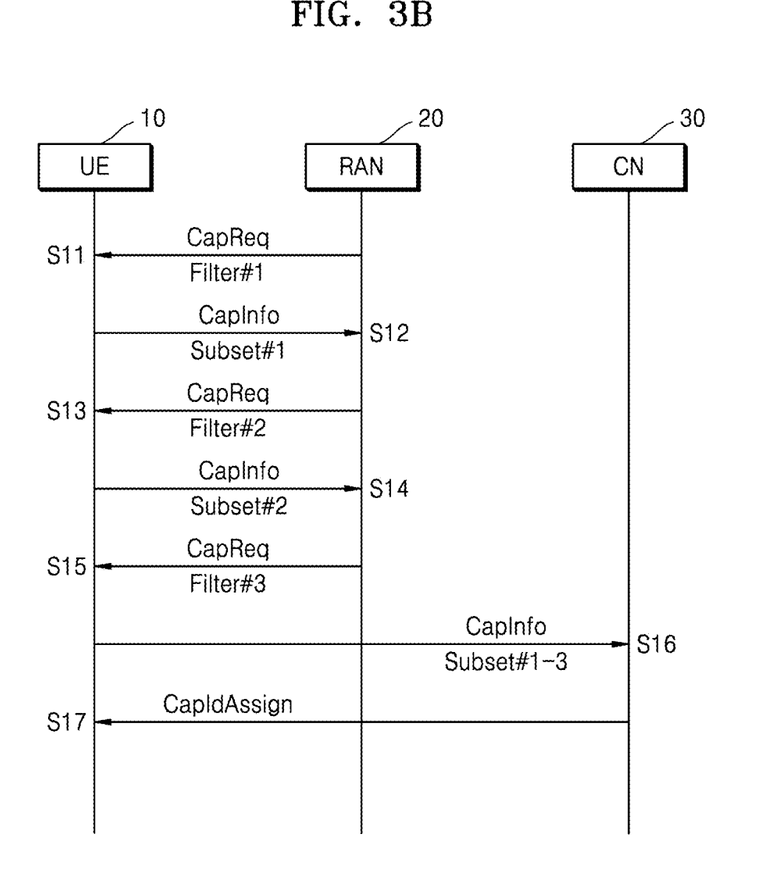
FIG. 3B shows a message flow diagram according to an embodiment of the invention.

The RAN may upload the capabilities to CN either stepwise, as shown in FIG. 3a, or it may collect the capabilities transferred in the different steps and then upload these to CN together, as shown in FIG. 3b in step S16. Steps S11-S15 and S17 are broadly similar to respective steps in FIG. 3a.

The CN may subsequently assign a capability ID to the UE e.g. a PLMN assigned capability ID. This CapID reflects the total set of capabilities required by a RAN node in this particular area, as reflected by the filters used in the preceding steps. An identity (RnF-ID) may be used to indicate this particular subset (ReqCapSubset). Such an identity makes it possible to re-use the capability ID when the UE returns to this RAN area after having moved to another RAN area in which a different subset of capabilities is used.

When the UE capabilities of different RAT's are transferred, this may be performed in different steps, as set out above. When the PLMN assigns a CapID, it should cover the different RATs which are supported. In other words, it should be clear which RAT capabilities are associated with the CapID. In particular, a UE receiving a PLMN assigned CapID should know to which capabilities the UE previously transferred this corresponds to. As an example, in FIG. 3a, the capID is assigned by the message in S7 and from this message the UE should know whether this ID correspond to the capabilities it transferred in S2, S4 and S6. As an example, the message in S7 (and possibly the messages in S2, S4 and S6) may include some information that enables the UE to associate it with the Capability information messages in S2, S4 and S6.

Figure 4:
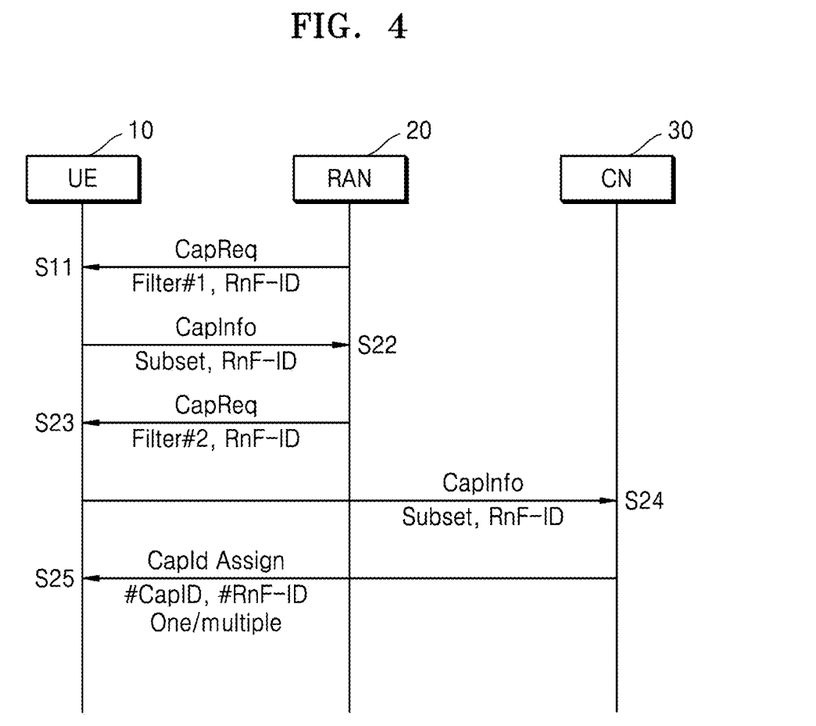
FIG. 4 shows a message flow diagram according to an embodiment of the invention.

In order to ensure this is addressed, the setting a PLMN-assigned CapID, the network may explicitly indicate which RAT containers previously assigned the CapID covers. An example is shown in FIG. 4, where the RnF-ID is included in messages S21, S22, S23, S24 and S25.

In particular, the network may provide an identifier reflecting the subset of capabilities previously requested across the different steps. This may be provided alongside the capID, or possibly within the capID itself.

In some cases an explicit RnF-ID may not be used. E.g. the ID may correspond to a particular area of the Radio Access Network, possibly represented by an identity on broadcast. The UE may assume that a CapID assigned by the network corresponds to the area in which it was received and the capabilities that were uploaded.

Figure 5:
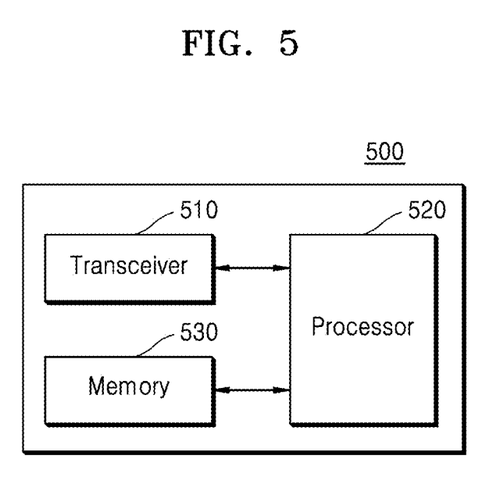
FIG. 5 is a block diagram illustrating a UE 500 according to another embodiment of the present disclosure.

FIG. 5 is a block diagram illustrating a UE 500 according to another embodiment of the present disclosure.

Referring to the FIG. 5, the UE 500 may include a transceiver 510, a processor 520, and a memory 530. However, all of the illustrated components are not essential. The UE 500 may be implemented by more or less components than those illustrated in FIG. 5. In addition, the transceiver 510, the processor 520 and the memory 530 may be implemented as a single chip according to another embodiment.

The aforementioned components will now be described in detail.

The transceiver 510 may include a RF transmitter for up-converting and amplifying a transmitted signal, and a RF receiver for down-converting a frequency of a received signal. However, according to another embodiment, the transceiver 510 may be implemented by more or less components than those illustrated in components.

The transceiver 510 may be connected to the processor 520 and transmit and/or receive a signal. The signal may include control information and data. In addition, the transceiver 510 may receive the signal through a wireless channel and output the signal to the processor 520. The transceiver 510 may transmit a signal output from the processor 520 through the wireless channel.

The processor 520 may include one or more processors or other processing devices that control the proposed function, process, and/or method. Operation of the UE 500 may be implemented by the processor 520.

The processor 520 may decodes the information in both messages to determine which frequency(ies) to measure. The processor 520 may perform the measurement(s) required (while in an idle state). The processor 520 may reports back to the network with the results of the measurement(s) (typically upon or immediately following transition to a connected state). Additionally, the manner in which the information included in the dedicated and broadcast signals may be combined in different ways. As set out above, the frequency information supplied to the UE via both dedicated and broadcast signalling is logically ANDed so that only frequencies appearing in both forms of signalling for a particular UE are measured. However, the information appearing in each form of signalling could, instead, be logically ORed, whereby a frequency appearing in only one of the lists is measured.

In addition, the processor 520 may perform above-described operations of the UE with reference to FIGS. 1 to 4.

The memory 530 may store the control information or the data included in a signal obtained by the UE 500. The memory 530 may be connected to the processor 520 and store at least one instruction or a protocol or a parameter for the proposed function, process, and/or method. The memory 530 may include read-only memory (ROM) and/or random access memory (RAM) and/or hard disk and/or CD-ROM and/or DVD and/or other storage devices.

Figure 6:
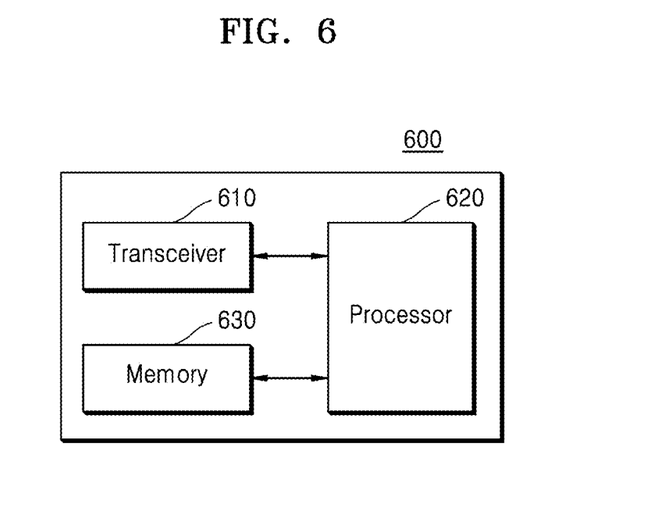
FIG. 6 is a block diagram illustrating a network entity 600 according to another embodiment of the present disclosure.

FIG. 6 is a block diagram illustrating a network entity 600 according to another embodiment of the present disclosure.

Referring to the FIG. 6, the network entity 600 may include a transceiver 610, a processor 620, and a memory 630. However, all of the illustrated components are not essential. The network entity 600 may be implemented by more or less components than those illustrated in FIG. 6. In addition, the transceiver 610, the processor 620 and the memory 630 may be implemented as a single chip according to another embodiment. The network entity may be the CN or the RAN.

The aforementioned components will now be described in detail.

The transceiver 610 may include a RF transmitter for up-converting and amplifying a transmitted signal, and a RF receiver for down-converting a frequency of a received signal.

However, according to another embodiment, the transceiver 610 may be implemented by more or less components than those illustrated in components.

The transceiver 610 may be connected to the processor 620 and transmit and/or receive a signal. The signal may include control information and data. In addition, the transceiver 610 may receive the signal through a wireless channel and output the signal to the processor 620. The transceiver 610 may transmit a signal output from the processor 620 through the wireless channel.

The processor 620 may include one or more processors or other processing devices that control the proposed function, process, and/or method. Operation of the network entity 600 may be implemented by the processor 620.

The processor 620 may control the transceiver to broadcast a first message. The processor 620 may control the transceiver to transmits to the UE a dedicated second message (typically when commanding UE to enter an idle state e.g. when releasing the radio connection). The processor 620 may control the transceiver to receive results of the measurement from the UE. In addition, the processor 620 may perform above-described operations of the network with reference to FIGS. 1 to 4.

The memory 630 may store the control information or the data included in a signal obtained by the network entity 600. The memory 630 may be connected to the processor 620 and store at least one instruction or a protocol or a parameter for the proposed function, process, and/or method. The memory 630 may include read-only memory (ROM) and/or random access memory (RAM) and/or hard disk and/or CD-ROM and/or DVD and/or other storage devices.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of operating a terminal in a wireless communication system, the method comprising:
   receiving a dedicated message including information associated with a first list including one or more frequencies to be measured;
   receiving system information including information associated with a second list including one or more frequencies to be measured and configuration information for measurement on the one or more frequencies included in the second list via a broadcast signaling;
   identifying whether at least one frequency included in the first list is included in the second list; and
   in case that the at least one frequency included in the first list is included in the second list, performing measurement on the at least one frequency commonly included in both the first list and the second list in an idle state or in an inactive state,
   wherein at least one frequency, included in the first list and not included in the second list, is not measured on in the idle state or in the inactive state.

2. The method of claim 1, further comprising:
   entering the idle state or the inactive state based on the dedicated message.

3. The method of claim 1, wherein the performing the measurement comprises:
   in case that a first frequency included in the second list is the same as a frequency included in the first list and configuration information for measurement on the first frequency is not included in the dedicated message and is included in the system information, performing measurement on the first frequency based on the configuration information for measurement on the first frequency included in the system information.

4. The method of claim 1,
   wherein in case that a first frequency is included in the first list and the dedicated message further includes configuration information for measurement on the first frequency, the performing the measurement comprises performing measurement on the first frequency based on the configuration information for measurement on the first frequency in the dedicated message even if a different measurement configuration is included for the first frequency in the system information.

5. The method of claim 1, wherein the terminal operates in one of a Carrier Aggregation (CA) or Dual Connectivity (DC) mode prior to entering the idle state or the inactive state.

6. A method of operating a base station (BS) in a wireless communication system, the method comprising:
   transmitting, to a terminal, a dedicated message including information associated with a first list including one or more frequencies to be measured;
   transmitting, to the terminal, system information including information associated with a second list including one or more frequencies to be measured and configuration information for measurement on the one or more frequencies included in the second list via a broadcast signaling; and
   receiving, from the terminal, a result of measurement on at least one frequency commonly included in both the first list and the second list,
   wherein the result of measurement on the at least one frequency commonly included in both the first list and the second list comprises information measured in case that the terminal is in an idle state or in an inactive state, and
   wherein at least one frequency, included in the first list and not included in the second list, is not measured on in case that the terminal is in the idle state or in the inactive state.

7. The method of claim 6, wherein the dedicated message is used to enter the idle state or the inactive state by the terminal.

8. The method claim 6, wherein the result of measurement on the at least one frequency commonly included in both the first list and the second list comprises:
   the result of measurement on a first frequency based on configuration information for measurement on the first frequency included in the system information in case that the first frequency included in the second list is same as a frequency included in the first list and the configuration information for measurement on the first frequency is not included in the dedicated message and is included in the system information.

9. The method claim 6, wherein a first frequency is included in the first list and the dedicated message further includes measurement configuration information for measurement on the first frequency, and
   wherein the result of measurement on the at least one frequency commonly included in both the first list and the second list comprises:
   the result of measurement on a first frequency based on the measurement configuration information for measurement on the first frequency in the dedicated message even if a different measurement configuration is included for the first frequency in the system information.

10. The method of claim 6, wherein the terminal operates in one of a Carrier Aggregation (CA) or Dual Connectivity (DC) mode prior to entering the idle state or the inactive state.

11. A terminal in a wireless communication system, the terminal comprising:
    a transceiver; and
    at least one processor configured to:
    control the transceiver to receive a dedicated message including information associated with a first list including one or more frequencies to be measured,
    control the transceiver to receive system information including information associated with a second list including one or more frequencies to be measured and configuration information for measurement on the one or more frequencies included in the second list via a broadcast signaling, identify whether at least one frequency included in the first list is included in the second list, and in case that the at least one frequency included in the first list is included in the second list, perform measurement on at least one frequency commonly included in both the first list and the second list in an idle state or in an inactive state, wherein at least one frequency, included in the first list and not included in the second list, is not measured on in the idle state or in the inactive state.

12. The terminal of claim 11, wherein the at least one processor is configured to:

enter the idle state or the inactive state based on the dedicated message.

13. The terminal of claim 11, wherein the at least one processor is configured to:

in case that a first frequency included in the second list is the same as a frequency included in the first list and configuration information for measurement on the first frequency is not included in the dedicated message and is included in the system information, perform measurement on the first frequency based on the configuration information for measurement on the first frequency included in the system information.

14. The terminal of claim 11, wherein in case that a first frequency is included in the first list and the dedicated message further includes measurement configuration information for measurement on the first frequency, the at least one processor is further configured to:

perform measurement on the first frequency based on the measurement configuration information for measurement on the first frequency in the dedicated message even if a different measurement configuration is included for the first frequency in the system information.

15. The terminal of claim 11, wherein the terminal operates in one of a Carrier Aggregation (CA) or Dual Connectivity (DC) mode prior to entering the idle state or the inactive state.

16. A base station in a wireless communication system, the base station comprising:

a transceiver; and at least one processor configured to:

control the transceiver to transmit, to a terminal, a dedicated message including information associated with a first list including one or more frequencies to be measured, control the transceiver to transmit, to the terminal, system information including information associated with a second list including one or more frequencies to be measured and configuration information for measurement on the one or more frequencies included in the second list via a broadcast signaling, and control the transceiver to receive, from the terminal, a result of measurement on at least one frequency commonly included in both the first list and the second list, wherein the result of measurement on the at least one frequency commonly included in both the first list and the second list comprises information measured in case that the terminal is in an idle state or in an inactive state, and wherein at least one frequency, included in the first list and not included in the second list, is not measured on in case that the terminal is in the idle state or in the inactive state.

17. The base station of claim 16, wherein the dedicated message is used to enter the idle state or the inactive state by the terminal.

18. The base station of claim 16, wherein the result of measurement on the at least one frequency commonly included in both the first list and the second list comprises:

the result of measurement on a first frequency based on configuration information for measurement on the first frequency included in the system information in case that the first frequency included in the second list is same as a frequency included in the first list and the configuration information for measurement on the first frequency is not included in the dedicated message and is included in the system information.

19. The base station of claim 16, wherein a first frequency is included in the first list and the dedicated message further includes measurement configuration information for measurement on the first frequency, and wherein the result of measurement on the at least one frequency commonly included in both the first list and the second list comprises:

the result of measurement on a first frequency based on the measurement configuration information for measurement on the first frequency in the dedicated message even if a different measurement configuration is included for the first frequency in the system information.

20. The base station of claim 16, wherein the terminal operates in one of a Carrier Aggregation (CA) or Dual Connectivity (DC) mode prior to entering the idle state or the inactive state.

* * * * *